(12) United States Patent
Wierstra et al.

(10) Patent No.: US 11,200,482 B2
(45) Date of Patent: *Dec. 14, 2021

(54) RECURRENT ENVIRONMENT PREDICTORS

(71) Applicant: DeepMind Technologies Limited, London (GB)

(72) Inventors: Daniel Pieter Wierstra, London (GB); Shakir Mohamed, London (GB); Silvia Chiappa, Cambridge (GB); Sebastien Henri Andre Racaniere, London (GB)

(73) Assignee: DeepMind Technologies Limited, London (GB)

(*) Notice: Subject to any disclaimer, the term of this patent is extended or adjusted under 35 U.S.C. 154(b) by 64 days.

This patent is subject to a terminal disclaimer.

(21) Appl. No.: 16/893,565

(22) Filed: Jun. 5, 2020

(65) Prior Publication Data

US 2020/0342289 A1 Oct. 29, 2020

Related U.S. Application Data

(63) Continuation of application No. 16/403,352, filed on May 3, 2019, now Pat. No. 10,713,559, which is a (Continued)

(51) Int. Cl.
*G06N 3/04* (2006.01)
*G06N 3/08* (2006.01)
*G06N 3/00* (2006.01)

(52) U.S. Cl.
CPC .......... *G06N 3/0445* (2013.01); *G06N 3/006* (2013.01); *G06N 3/0454* (2013.01); *G06N 3/08* (2013.01)

(58) Field of Classification Search
CPC .... G06N 3/006; G06N 3/0445; G06N 3/0454; G06N 3/08
See application file for complete search history.

(56) References Cited

U.S. PATENT DOCUMENTS

2016/0232440 A1* 8/2016 Gregor ................. G06N 3/0454

OTHER PUBLICATIONS

Oh et al., Action-Conditional Video Prediction using Deep Networks in Atari Games, Advances in Neural Information Processing Systems 28 (NIPS), pp. 1-26, Dec. 2015. (Year: 2015).*

(Continued)

*Primary Examiner* — Michael J Huntley
*Assistant Examiner* — Marshall L Werner
(74) *Attorney, Agent, or Firm* — Fish & Richardson P.C.

(57) ABSTRACT

Methods, systems, and apparatus, including computer programs encoded on a computer storage medium, for environment simulation. In one aspect, a system comprises a recurrent neural network configured to, at each of a plurality of time steps, receive a preceding action for a preceding time step, update a preceding initial hidden state of the recurrent neural network from the preceding time step using the preceding action, update a preceding cell state of the recurrent neural network from the preceding time step using at least the initial hidden state for the time step, and determine a final hidden state for the time step using the cell state for the time step. The system further comprises a decoder neural network configured to receive the final hidden state for the time step and process the final hidden state to generate a predicted observation characterizing a predicted state of the environment at the time step.

20 Claims, 4 Drawing Sheets

Related U.S. Application Data continuation of application No. PCT/IB2017/056904, filed on Nov. 4, 2017.

(60) Provisional application No. 62/418,149, filed on Nov. 4, 2016.

(56) References Cited

OTHER PUBLICATIONS

Srivastava et al., Unsupervised Learning of Video Representations using LSTMs, Jan. 2016. (Year: 2016).*
Auer et al, "Finite-time analysis of the multiarmed bandit problem," Machine Learning, 2002, pp. 47:236-256.
Bellemare et al, "The Arcade Learning Environment: An evaluation platform for general agents," Journal of Artificial Intelligence Research, 2013, pp. 47:253-279.
Bengio et al, "Scheduled sampling for sequence prediction with recurrent neural networks," Advances in Neural Information Processing Systems 28, 2015, pp. 1171-1179.
Fragkiadaki et al, "Learning visual predictive models of physics for playing billiards," arXiv preprint arXiv:1511.07404, 2015, 12 pages.
Graves, "Generating sequences with recurrent neural networks," arXiv preprint arXiv:1308.0850, 2013, 43 pages.
Hochreiter & Schmidhuber, "Long short-term memory," Neural Computation, 1997, pp. 9(8):1735-1780.
Huszár, "How (not) to train your generative model: Scheduled sampling, likelihood, adversary," 2016.
Lengyel & Dayan, "Hippocampal contributions to control: The third way," Advances in Neural Information Processing Systems 20 (NIPS), 2008, pp. 889-896.
Littman et al, "Predictive representations of state," Advances in Neural Information Processing Systems 14 (NIPS), 2002, pp. 1555-1561.
McCloskey, "Intuitive physics," Scientific American, 1983, pp. 248(4):122-130.
Mnih et al, "Asynchronous methods for deep reinforcement learning," Proceedings of the 33rd International Conference on Machine Learning, 2016, 10 pages.
Niv, "Reinforcement learning in the brain," Journal of Mathematical Psychology, 2009, pp. 3(3):139-154.
O'Regan & Noë, "A sensorimotor account of vision and visual consciousness," Behavioral and brain sciences, 2001, pp. 24(05):939-973.
Oh et al, "Action-conditional video prediction using deep networks in Atari games," Advances in Neural Information Processing Systems 28 (NIPS), 2015, pp. 2863-2871.
Oudeyer et al, "Intrinsic motivation systems for autonomous mental development," Evolutionary Computation, 2007, pp. 11(2):265-286.
Patraucean & Cipolla, "Spatio-temporal video autoencoder with differentiable memory," 2015, 13 pages.
PCT International Preliminary Report on Patentability in International Appln. No. PCT/IB2017/056904, dated May 16, 2019, 11 pages.
PCT International Search Report and Written Opinion in International Appln. No. PCT/IB2017/056904, dated Mar. 2, 2018.
Srivastava et al., Unsupervised Learning of Video Representations using LSTMs, Jan. 2016.
Talvitie, "Model regularization for stable sample rollouts," Proceedings of the Thirtieth Conference Annual Conference on Uncertainty in Artificial Intelligence (UAI-14), 2014, pp. 780-789.
Tamar et al, "Value Iteration Networks," Advances in Neural Information Processing Systems, 2016, 9 pages.
Torcs.Sourceforge.org [online], "Torcs: The open racing car simulator," Jan. 2018, [retrieved on May 6, 2019], retrieved from: URL <http://torcs.sourceforge.net/>, 4 pages.
Wahlström et al, "From pixels to torques: Policy learning with deep dynamical models," arXiv preprint arXiv:1502.02251, 2015.
Watter et al, "Embed to control: A locally linear latent dynamics model for control from raw images," Advances in Neural Information Processing Systems 28 (NIPS), 2015, pp. 2728-2736.
Xu et al, "Empirical evaluation of rectified activations in convolutional network," arXiv preprint arXiv:1505.00853, 2015, 5 pages.
Zaremba et al, "Recurrent neural network regularization," 2014, arXiv preprint arXiv:1409.2329, 8 pages.
Office Action in European Appln. No. 17807935.6, dated Aug. 18, 2021, 8 pages.

* cited by examiner

RECURRENT ENVIRONMENT PREDICTORS

CROSS-REFERENCE TO RELATED APPLICATIONS

This patent application is a continuation (and claims the benefit of priority under 35 USC 120) of U.S. patent application Ser. No. 16/403,352, filed May 3, 2019, which is a continuation application of, and claims priority to, PCT Patent Application No. PCT/IB2017/056904, filed on Nov. 4, 2017, which application claims the benefit under 35 U.S.C. § 119(e) of U.S. Patent Application No. 62/418,149, filed Nov. 4, 2016. The disclosure of each of the foregoing applications is incorporated herein by reference.

BACKGROUND

This specification relates to recurrent neural network systems and methods.

Machine learning systems can be used to predict future observations of the state of an environment that will result from an agent performing planned actions.

Machine learning systems for predicting future observations can include neural networks.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a neural network system. The neural network system includes a recurrent neural network that is configured to, at each of multiple time steps, receive a preceding action of an agent interacting with an environment, and update an initial hidden state, a final hidden state, and a cell state of the recurrent neural network from the preceding time step. The neural network system includes a decoder neural network that is configured, for one or more time steps, to process the final hidden state of the recurrent neural network and produce as output a predicted observation of the environment for the time step. The neural network system can therefore be considered an environment simulation system. Data characterizing a state of the environment will be referred to in this specification as an observation.

A preceding action is an action that either has been performed at the preceding time step by the agent (if, as of the preceding time step, the system was processing actions that have already been performed to condition future predictions) or will be performed at the preceding time step by the agent (if, as of the preceding time step, the system was already predicting future observations that will result from the agent performing planned actions).

Depending on the configuration of the system and of the decoder neural network, the decoder neural network may be configured to either (i) generate a predicted observation at each future time step, i.e., each time step at which the observation is not already known or (ii) generate predicted observations at only a subset of the future time steps, e.g., only for the time step after the last action in the planned trajectory of actions has been performed by the agent or at predetermined intervals for the future time steps.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation environment. In these implementations, the actions may be control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle. Accordingly, the system may be used to predict future observations to provide a more effective control system.

In a reinforcement learning system, an agent interacts with an environment by performing actions that are selected by the reinforcement learning system in response to receiving observations that characterize the current state of the environment.

In a reinforcement learning system, in many circumstances, e.g., to select actions to be performed by the agent or to see the effect of a planned trajectory of actions to be performed by the agent on the environment, it may be necessary or advantageous to predict, by an environment simulation system, one or more future observations characterizing future states of the environment resulting from actions that have been performed by the agent and actions that will be performed by the agent in the future.

In a model-based exploration system, where an agent interacts with a real-world or simulated environment in order to explore the environment, the exploration strategy of the agent may be based at least in part on predicted observations of the environment generated by the environment simulation system. For example, the agent may select sequences of actions which, according to the predictions of the environment simulation system, would cause the agent to observe parts of the environment that were previously unobserved.

According to a first aspect there is provided a method comprising: in a recurrent neural network implemented by one or more computers, at each of a plurality of time steps, receiving a preceding action for a preceding time step, the preceding action being an action performed at the preceding time step by an agent interacting with an environment or to be performed at the preceding time step by the agent; updating a preceding initial hidden state of the recurrent neural network from the preceding time step using the preceding action to generate an initial hidden state for the time step; updating a preceding cell state of the recurrent neural network from the preceding time step using at least the initial hidden state for the time step to generate a cell state for the time step; and determining a final hidden state for the time step using the cell state for the time step; and, in a decoder neural network implemented by the one or more computers, at each of one or more of the plurality of time steps: receiving the final hidden state for the time step; and processing the final hidden state to generate a predicted observation characterizing a predicted state of the environment at the time step.

In some implementations, the predicted observation is a predicted image of the environment at the time step.

In some implementations, updating the preceding initial hidden state comprises: applying a first parameter matrix to the preceding final hidden state to generate a transformed preceding final hidden state; applying a second parameter matrix to the preceding action to generate a transformed preceding action; and combining the transformed preceding hidden state and the transformed preceding action to generate the initial hidden state.

In some implementations, updating the preceding initial hidden state comprises: applying a dimension-preserving convolution having different parameters for different actions.

In some implementations, the method further comprises: at each of one or more initial time steps of the plurality of time steps, receiving an encoded representation of a preceding actual observation characterizing an actual state of the environment at the preceding time step; and updating the preceding cell state of the recurrent neural network from the preceding time step using the encoded representation of the preceding actual observation and the initial hidden state for the time step to generate the cell state for the time step.

In some implementations, the method further comprises, in an encoder neural network implemented by the one or more computers, at each of the one or more initial time steps: receiving the preceding actual observation; and processing the preceding actual observation to generate the encoded representation of the preceding actual observation.

In some implementations, the method further comprises: at each time step of the plurality of time steps that is after the one or more initial time steps: receiving an encoded representation of a preceding predicted observation characterizing a predicted state of the environment at the preceding time step; and updating the preceding cell state of the recurrent neural network from the preceding time step using the encoded representation of the preceding predicted observation and the initial hidden state for the time step to generate the cell state for the time step.

In some implementations, the method further comprises generating a predicted observation at each of the time steps that is after the one or more initial time steps.

In some implementations, the method further comprises: at each time step of the plurality of time steps that is after the one or more initial time steps: updating the preceding cell state of the recurrent neural network from the preceding time step using the initial hidden state for the time step and the preceding final hidden state from the preceding time step in place of the encoded representation of the preceding actual observation to generate the cell state for the time step.

In some implementations, the recurrent neural network uses a first set of parameters for each of the initial time steps and a second set of parameters for each time step that is after the one or more initial time steps.

In some implementations, the decoder neural network generates a predicted observation at only a subset of the time steps that are after the one or more initial time steps.

According to one arrangement there is provided an environment simulation system comprising: a recurrent neural network implemented by one or more computers and configured to, at each of a plurality of time steps, receive a preceding action for a preceding time step, the preceding action being an action performed at the preceding time step by an agent interacting with an environment or to be performed at the preceding time step by the agent; update a preceding initial hidden state of the recurrent neural network from the preceding time step using the preceding action to generate an initial hidden state for the time step; and update a preceding cell state of the recurrent neural network from the preceding time step using at least the initial hidden state for the time step to generate a cell state for the time step; and determine a final hidden state for the time step using the cell state for the time step; and a decoder neural network implemented by the one or more computers and configured to, at each of one or more of the plurality of time steps: receive the final hidden state for the time step; and process the final hidden state to generate a predicted observation characterizing a predicted state of the environment at the time step.

According to a further implementation there is provided a method comprising: obtaining, for each of one or more initial time steps, an encoded representation of a preceding actual observation characterizing an actual state of an environment at a preceding time step and a preceding action performed by an agent interacting with the environment in response to the action; processing, at each of the initial time steps, the encoded representation of the preceding actual observation and the preceding action using the recurrent neural network steps described above; obtaining data identifying a respective action to be performed by the agent at each of a plurality of time steps after a last time step of the initial time steps; and for each of the plurality of time steps after the last time step of the initial time step, processing a preceding action at a preceding time step using the recurrent neural network steps and the decoder neural network steps described above to generate one or more predicted observations.

According to a further implementation there is provided a system comprising one or more computers and one or more storage devices storing instructions that when executed by the one or more computers cause the one or more computers to perform the operations of any of the methods described herein.

According to a further implementation there is provided one or more computer storage media storing instructions that when executed by one or more computers cause the one or more computers to perform the operations of any of the methods described herein.

Particular embodiments of the subject matter described in this specification can be implemented so as to realize one or more of the following advantages. A neural network system as described in this specification can generate a predicted observation of the environment at a future time step without generating predicted observations of the environment for time steps between the current time step and the future time step, which makes the system more efficient than conventional systems that require the generation of predicted observations of the environment at every time step between the current step and a future step in order to generate a predicted observation of the environment at the future time step. Therefore, the system as described in this specification can generate a predicted observation of the environment at a future time step more quickly while consuming fewer computational resources (i.e. memory and processing power) than conventional systems. Moreover, at a given time step, the final hidden state of recurrent neural network in the system described in this specification depends directly on the preceding action of the agent, and this architecture causes the system described in this specification to generate accurate, high-dimensional predictions hundreds of time steps into the future, in contrast to conventional systems which do not have this architecture and produce less accurate predictions. In general, the system described in this specification produces more spatially and temporally coherent and higher-accuracy predictions than conventional systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
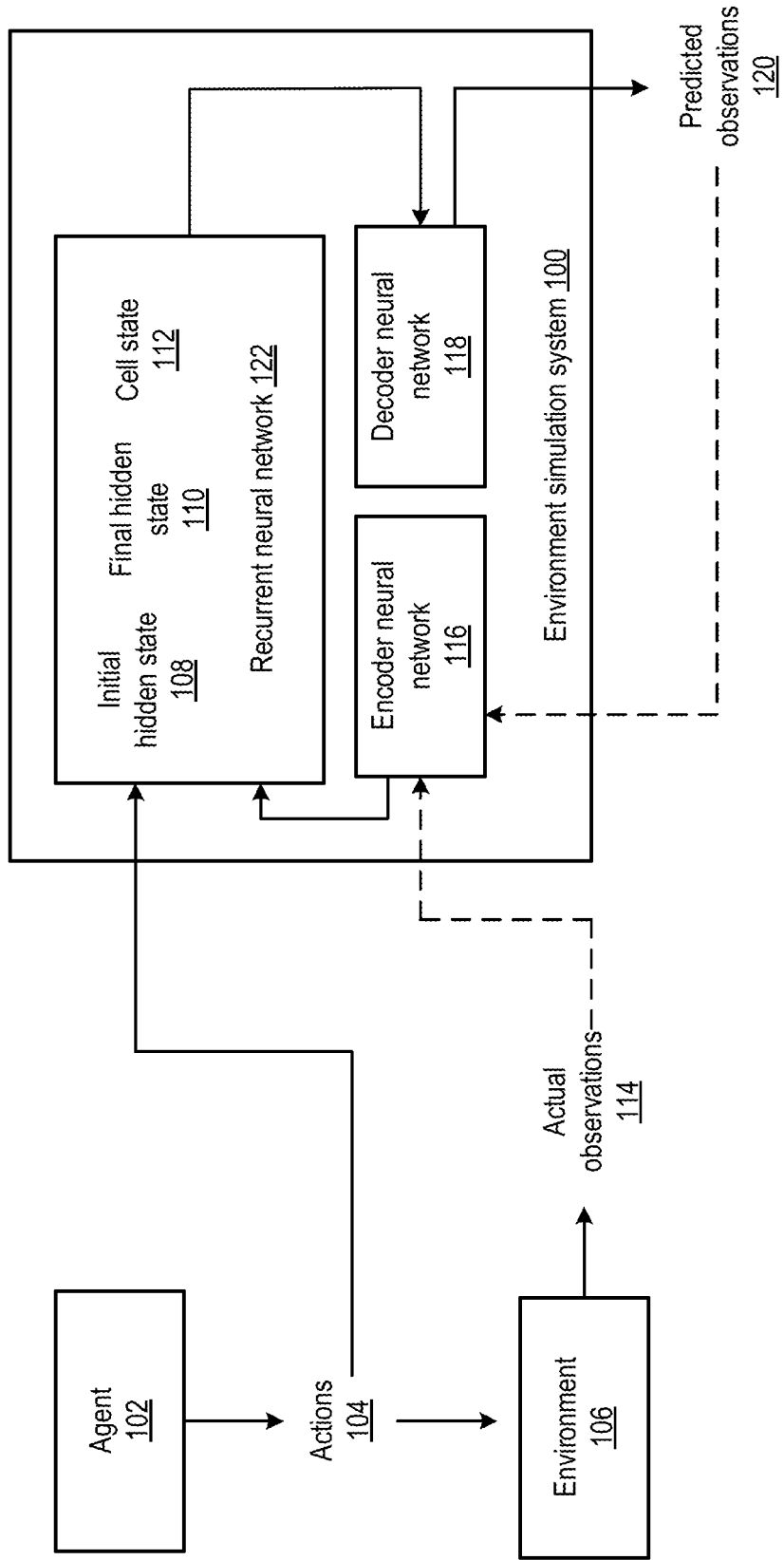
FIG. 1 shows an example environment simulation system.

FIG. 1 shows an example environment simulation system 100. The environment simulation system 100 is an example of a system implemented as computer programs on one or more computers in one or more locations in which the systems, components, and techniques described below are implemented.

The environment simulation system 100 generates predicted observations 120 that characterize predicted future states of an environment 106 at future time steps. The state of the environment 106, and hence observations of the environment 106, may change between time steps, based at least in part on the actions 104 of an agent 102 that is interacting with the environment 106 at each of the time steps.

The environment simulation system 100 receives as input a sequence of actions 104 performed by the agent 102 at each of multiple time steps. The sequence of actions 104 includes actions at one or more initial time steps and, for each of those initial time steps, an actual observation of the environment for the time step. The actions at initial time steps are actions that have already been performed by the agent 102. The actions at the one or more time steps after the initial time steps are actions that will be performed by the agent in the future, i.e., planned actions.

The environment simulation system 100 processes the actions that have already been performed at the one or more initial time steps to condition future predictions. One example process for processing actions that have already been performed to condition future predictions is described with reference to process 200 of FIG. 2.

After processing the actions that have already been performed at the one or more initial time steps, the environment simulation 100 predicts future observations that will result from the agent 102 performing planned actions at the time steps after the initial time steps by either a prediction-dependent prediction process or a prediction-independent prediction process.

In the prediction-dependent implementation for predicting future observations, the environment simulation system 100 sequentially generates, at each time step after the initial time steps, predicted observations 120 that will result from the agent 102 performing planned actions, where the environment simulation system 100 generates the predicted observation for a time step based on the predicted observation generated at the preceding time step. One example prediction-dependent process for predicting future observations that will result from the agent 102 performing planned actions is described with reference to process 300 of FIG. 3.

In the prediction-independent implementation for predicting future observations, the environment simulation system 100 can generate the predicted observation 120 for a time step after the initial time steps without reference to any predicted observations the system may have generated for previous time steps, and in general the environment simulation system 100 is not required to generate a predicted observation at every time step. One example prediction-independent process for predicting future observations that will result from the agent performing planned actions is described with reference to process 400 of FIG. 4.

In some implementations, the environment 106 and the agent 102 are simulations implemented as one or more computer programs. For example, the environment 106 may be a video game and the agent 102 may be a simulated user playing the video game. As another example, the environment 106 may be a motion simulation environment, e.g., a driving simulation or a flight simulation, and the agent 102 may be a simulated vehicle navigating through the motion simulation environment. In these implementations, the actions 104 may be control inputs to control the simulated user or simulated vehicle.

In some other implementations, the environment 106 is a real-world environment and the agent 102 is a mechanical agent interacting with the real-world environment. For example, the agent 102 may be a robot interacting with the environment 106 to accomplish a specific task. As another example, the agent 102 may be an autonomous or semi-autonomous vehicle navigating through the environment 106. In these implementations, the actions 104 may be control inputs to control the robot or the autonomous vehicle.

The environment simulation system 100 includes a recurrent neural network 122. At each time step, the recurrent neural network 122 updates an initial hidden state 108 of the recurrent neural network 122, a final hidden state 110 of the recurrent neural network 122, and a cell state 112 of the recurrent neural network 122 based in part on a preceding action that the recurrent neural network 122 receives as input at each time step. The preceding action is either (i) an action that has been performed at the preceding time step by the agent 102 (if, as of the preceding time step, the environment simulation system 100 is processing actions that have already been performed to condition future predictions) or (ii) an action to be performed at the preceding time step by the agent 102 (if, as of the preceding time step, the environment simulation system 100 is already predicting future observations that will result from the agent 102 performing planned actions).

The environment simulation system 100 also includes a decoder neural network 118 that, for one or more of the time steps after the initial time steps, takes as input the final hidden state 110 of the recurrent neural network 122 for the time step and generates a predicted observation 120 characterizing the predicted state of the environment 106 at the time step.

When the observations are images, the decoder neural network 118 is a deconvolutional neural network.

In some implementations, the predicted observation 120 characterizing the predicted state of the environment 106 at a time step may be a predicted image of the environment at the time step.

The environment simulation system 100 also includes an encoder neural network 116. If the environment simulation system 100 is, as of the preceding time step, processing actions that have already been performed to condition future predictions, then the encoder neural network 116 takes as input the actual observation 114 of the preceding time step and generates as output a representation of the actual observation 114 of the preceding time step. The system provides the representation of the actual observation 114 of the preceding time step as an input to the recurrent neural network 122.

If the environment simulation system 100 is, as of the preceding time step, already predicting future observations that will result from the agent 102 performing planned actions, then in the prediction-dependent implementation, the encoder neural network 116 takes as input the predicted observation 120 of the preceding time step and generates as output a representation of the predicted observation 120 of the preceding time step. In the prediction-dependent implementation, the system provides the representation of the predicted observation 120 of the preceding time step as an input to the recurrent neural network 122.

If the environment simulation system 100 is, as of the preceding time step, already predicting future observations that will result from the agent 102 performing planned actions, then in the prediction-independent implementation, the encoder neural network 116 is not used by the system for the time step.

When the observations are images, the encoder neural network 116 is a convolutional neural network that is configured to generate as output an encoded representation of the input to the encoder neural network 116.

Figure 2:
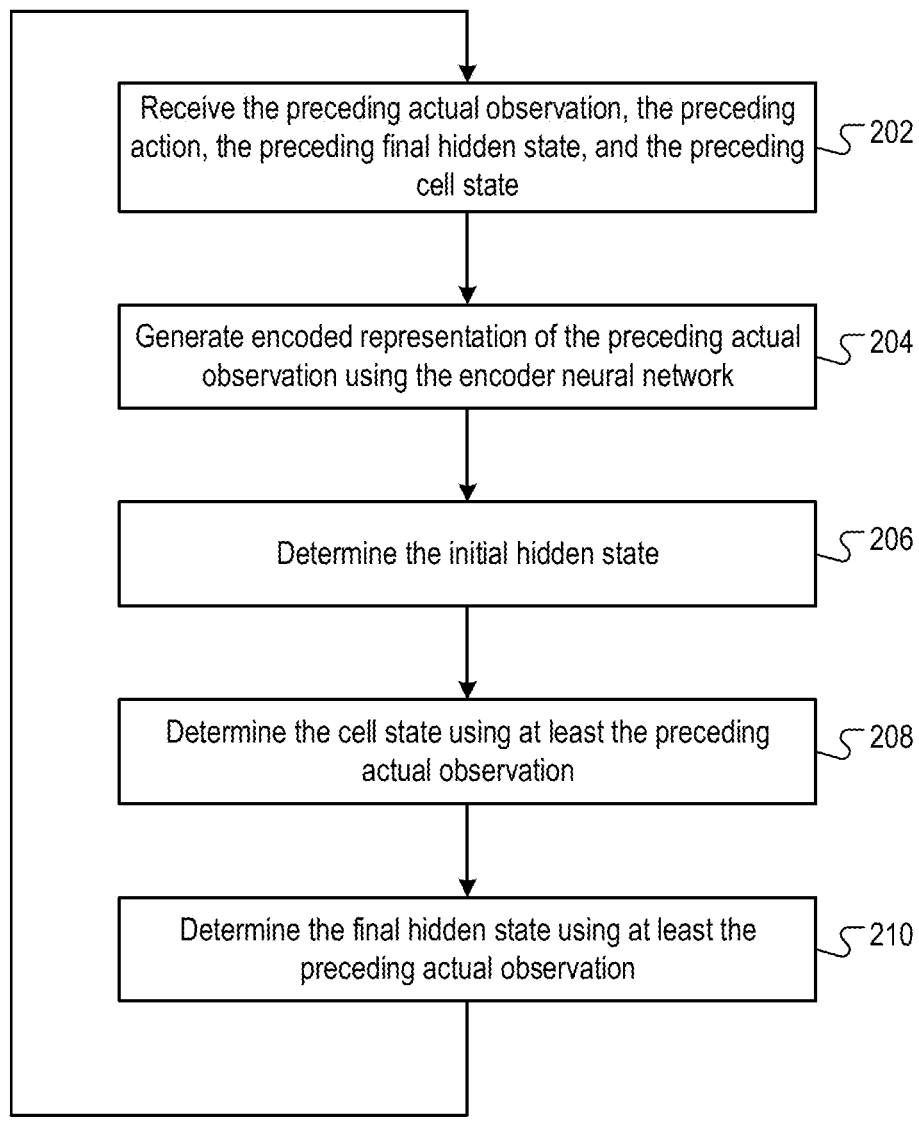
FIG. 2 is a flow diagram of an example process for processing actions that have already been performed to condition future predictions.

FIG. 2 is a flow diagram of an example process 200 for processing actions that have already been performed to condition future predictions. For convenience, the process 200 will be described as being performed by a system of one or more computers located in one or more locations. For example, an environment simulation system, e.g., the environment simulation system 100 of FIG. 1, appropriately programmed in accordance with this specification, can perform the process 200.

In general, the system performs the steps of the process 200 to process actions that have already been performed to condition future predictions, i.e. initialize the cell state, initial hidden state, and final hidden state of the recurrent neural network. The system performs the steps of the process 200 at each of one or more initial time steps.

The system receives a preceding actual observation of the environment, the preceding action that was performed at the preceding time step by the agent, and the preceding final hidden state and preceding cell state of the recurrent neural network (step 202). The preceding actual observation is data characterizing the state of the environment at the preceding time step. In some implementations, the preceding actual observation is an image of the environment at the preceding time step. In some implementations, the preceding action is represented as a one-hot vector representation. The preceding final hidden state and the preceding cell state are the values of final hidden state and the cell state of the recurrent neural network at the end of the processing for the preceding time step.

The system provides the preceding actual observation as input to the encoder neural network (step 204). The encoder neural network is configured to process the preceding actual observation in accordance with the values of a set of parameters of the encoder neural network to generate as output a representation of the preceding actual observation.

The recurrent neural network determines the initial hidden state of the recurrent neural network for the time step by applying a first parameter matrix to the preceding final hidden state of the recurrent neural network to generate a transformed preceding final hidden state, applying a second parameter matrix to the preceding action to generate a transformed preceding action, and combining the transformed preceding hidden state and the transformed preceding action to generate the initial hidden state of the recurrent neural network for the time step (step 206).

In some implementations, the transformed preceding hidden state and the transformed preceding action are combined by element-wise multiplication. In some implementations, the transformed preceding hidden state and the transformed preceding action are combined by a dimension-preserving convolution with different parameters for each action.

The recurrent neural network determines the cell state of the recurrent neural network for the time step based on the initial hidden state of the recurrent neural network for the time step, the representation of the preceding actual observation output by the encoder neural network, and the preceding cell state of the recurrent neural network (step 208). Specifically, the recurrent neural network determines the values of an input gate hidden state and forget gate hidden state for the time step according to the following relationships:

$$i_t = \sigma(L^{iv}(v_t) + L^{is}(s_{t-1}))$$

$$f_t = \sigma(L^{fv}(v_t) + L^{fs}(s_{t-1}))$$

where $v_t$ is the initial hidden state for the time step and $s_{t-1}$ is the representation of the preceding actual observation output by the encoder neural network, it is the input gate hidden state for the time step, $f_t$ is the forget gate hidden state for the time step, and $L^{iv}$, $L^{is}$, $L^{fv}$, and $L^{fs}$ are linear mappings that do not share parameters. The recurrent neural network determines the cell state for the time step according to the following relationship:

$$c_t = f_t * c_{t-1} + i_t * \tan h(L^{cv}(v_t) + L^{cs}(s_{t-1})),$$

where $L^{cv}$, $L^{cs}$ are linear mappings that do not share parameters and * represents element-wise multiplication.

In some implementations, the linear mappings $L^{iv}$, $L^{is}$, $L^{fv}$, $L^{fs}$, $L^{cv}$, and $L^{cs}$ are fully-connected linear mappings. In some other implementations, the linear mappings $L^{iv}$, $L^{is}$, $L^{fv}$, $L^{fs}$ $L^{cv}$, and $L^{cs}$ are dimension-preserving convolutions.

The recurrent neural network determines the final hidden state of the recurrent neural network for the time step based on the initial hidden state of the recurrent neural network for the time step, the representation of the preceding actual observation output by the encoder neural network, and the cell state of the recurrent neural network for the time step (step 210). Specifically, the recurrent neural network determines the values of an output gate hidden state:

$$o_t = \sigma(L^{ov}(v_t) + L^{os}(s_{t-1})),$$

where $v_t$ is the initial hidden state for the time step and $s_{t-1}$ is the representation of the preceding actual observation output by the encoder network, $o_t$ is the output gate hidden state for the time step, and $L^{ov}$ and $L^{os}$ are linear mappings that do not share parameters. The final hidden state for the time step is determined as:

$$h_t = o_t * \tan h(c_t),$$

where * represents element-wise multiplication.

In some implementations, the linear mappings $L^{ov}$ and $L^{os}$ are fully-connected linear mappings. In some other implementations, the linear mappings $L^{ov}$ and $L^{os}$ are dimension-preserving convolutions.

Next, the system goes to the next time step.

If the next time step is another initial time step for processing actions that have already been performed to condition future predictions, i.e. initialize the cell state, initial hidden state, and final hidden state of the recurrent neural network, then the system returns to step 202 and repeats the preceding steps.

Figure 3:
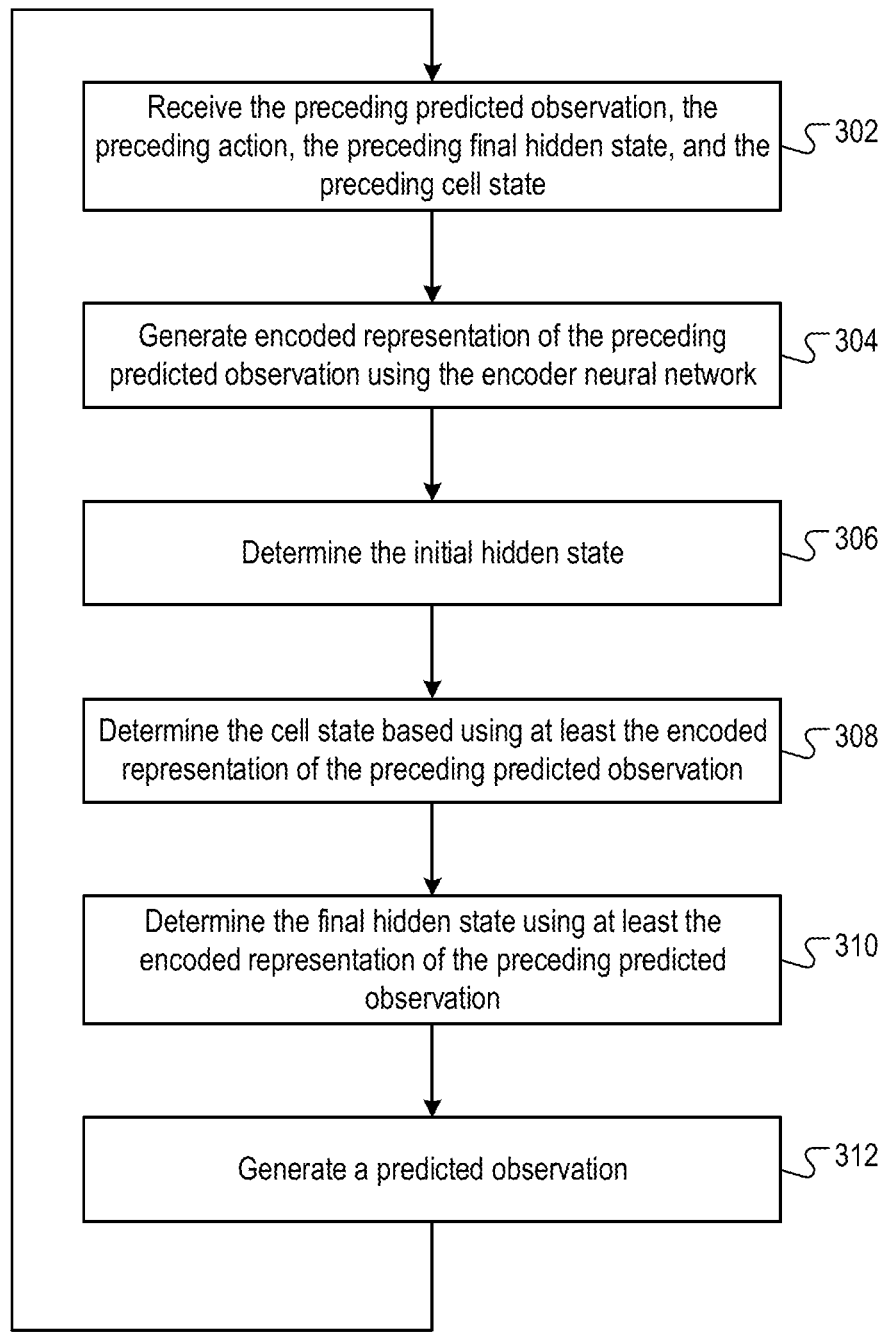
FIG. 3 is a flow diagram of an example prediction-dependent process for predicting future observations that will result from the agent performing planned actions.

If the next time step is not an initial time step, then in one implementation the system proceeds to perform the process 300 of FIG. 3, in which case the system implements a prediction-dependent process for predicting future observations that will result from the agent performing planned actions. In another implementation, the system proceeds to perform the process 400 of FIG. 4, in which case the system implements a prediction-independent process for predicting future observations that will result from the agent performing planned actions. In both implementations, at each time step the system updates the final hidden state of the recurrent neural network based on the preceding action of the preceding time step.

FIG. 3 is a flow diagram of an example process 300 for prediction-dependent prediction of future observations that will result from the agent performing planned actions. For convenience, the process 300 will be described as being performed by a system of one or more computers located in one or more locations. For example, an environment simulation system, e.g., the environment simulation system 100 of FIG. 1, appropriately programmed in accordance with this specification, can perform the process 300.

The system sequentially performs the steps of the process 300 for each time step after the one or more initial time steps. At each time step, the system generates, based on a predicted observation the system generated for the preceding time step, a predicted observation for the time step that will result from the agent performing planned actions.

The system receives the preceding predicted observation, the preceding action, the preceding final hidden state of the recurrent neural network, and the preceding cell state of the recurrent neural network (step 302). The preceding predicted observation is predicted data characterizing the state of the environment at the preceding time step that is generated by the system at the preceding time step.

For the first iteration of the process 300, where the preceding predicted observation is not defined since the system has not generated a predicted observation for the preceding time step, the system receives the preceding actual observation instead of the preceding predicted observation.

The system provides the preceding predicted observation to the encoder neural network, and the encoder neural network processes the preceding predicted observation in accordance with the values of a set of parameters of the encoder neural network to generate as output a representation of the preceding predicted observation (step 304).

The recurrent neural network determines the initial hidden state of the recurrent neural network for the time step based on the preceding action and the preceding final hidden state of the recurrent neural network (step 306) in the same manner as step 206.

The recurrent neural network determines the cell state of the recurrent neural network for the time step in the same manner as step 208, except the recurrent neural network uses the representation of the preceding predicted observation output by the encoder neural network in place of the representation of the preceding actual observation output by the encoder neural network (step 308).

The recurrent neural network determines the final hidden state of the recurrent neural network for the time step in the same manner as step 210, except the recurrent neural network uses the representation of the preceding predicted observation output by the encoder neural network in place of the representation of the preceding actual observation output by the encoder neural network (step 310).

The system generates a predicted observation for the time step by providing the final hidden state of the recurrent neural network for the time step as input to the decoder neural network, which processes the final hidden state of the recurrent neural network in accordance with the values of a set of parameters of the decoder neural network, and generates as output a predicted observation for the time step (step 312). The decoder neural network may include both convolutional and fully connected layers.

If the time step is not the final time step, the system goes to step 302 and repeats the preceding steps. If the time step is the final time step, the process 300 terminates.

Figure 4:
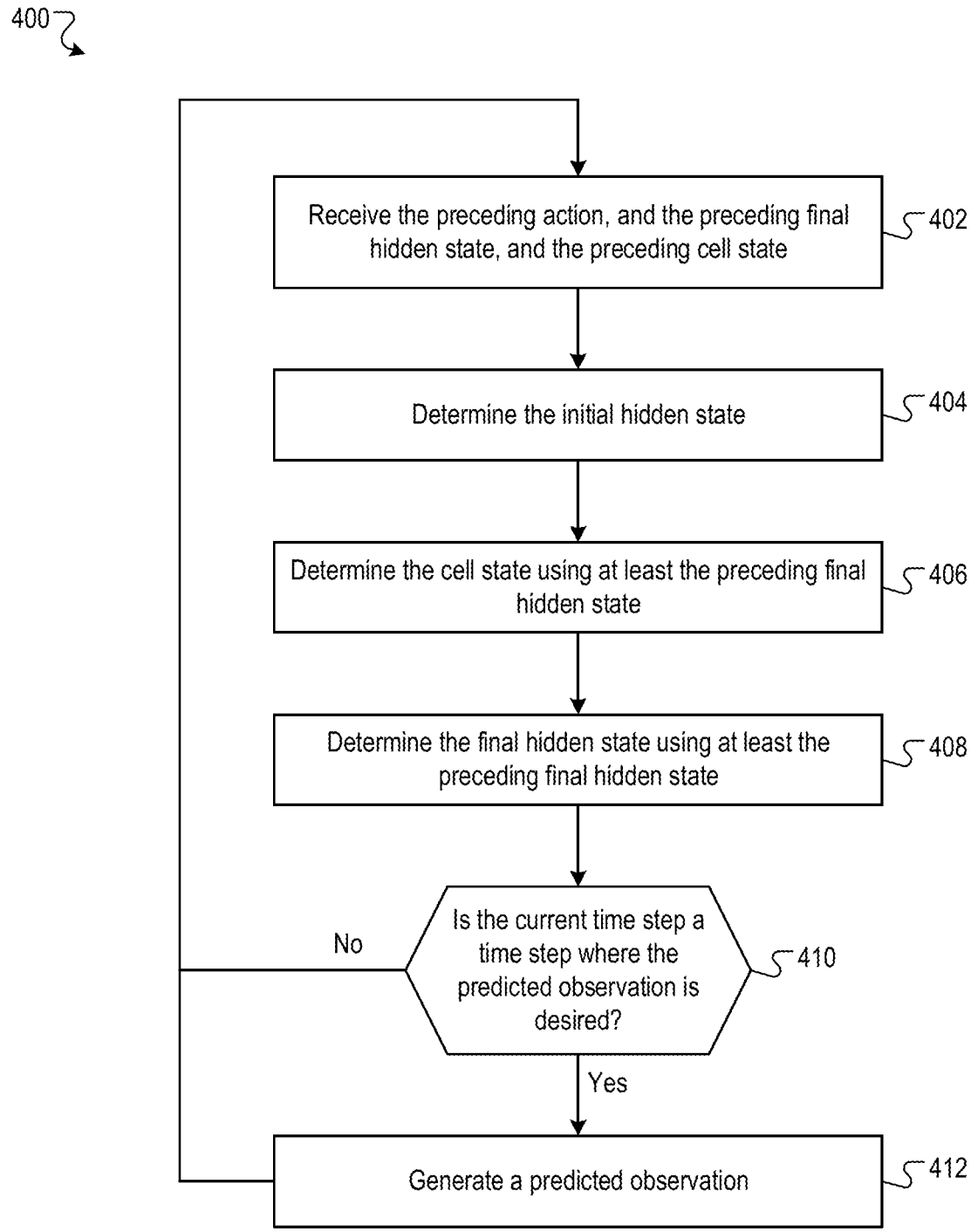
FIG. 4 is a flow diagram of an example prediction-independent process for predicting future observations that will result from the agent performing planned actions.

FIG. 4 is a flow diagram of an example process 400 for prediction-independent prediction of future observations that will result from the agent performing planned actions. For convenience, the process 400 will be described as being performed by a system of one or more computers located in one or more locations. For example, an environment simulation system, e.g., the environment simulation system 100 of FIG. 1, appropriately programmed in accordance with this specification, can perform the process 400.

The system sequentially performs the steps of the process 400 for each time step after the one or more initial time steps. At each time step after the one or more initial time steps, the system can generate a predicted observation for the time step that will result from the agent performing planned actions, where the predicted observation is not based on any predicted observations the system may have generated for previous time steps.

In general, for implementations of prediction-independent prediction, the system uses a first set of recurrent neural network parameters for each of the initial time steps and a second, different set of recurrent neural network parameters for each time step that is after the one or more initial time steps. In particular, the parameter values of the linear mappings $L^{iv}$, $L^{is}$, $L^{fv}$, $L^{fs}$, $L^{cv}$, $L^{cs}$, $L^{ov}$, and $L^{os}$ are different between the initial time steps and the one or more time steps that are after the initial time steps.

The system receives the preceding action, the preceding final hidden state of the recurrent neural network, and the preceding cell state of the recurrent neural network (step 402).

The recurrent neural network determines the initial hidden state of the recurrent neural network for the time step based on the preceding action and the preceding final hidden state of the recurrent neural network (step 404) in the same manner as step 206.

The recurrent neural network determines the cell state of the recurrent neural network for the time step using the second set of recurrent neural network parameters in the same manner as step 208, except the recurrent neural network uses the preceding final hidden state of the recurrent neural network in place of the representation of the preceding actual observation output by the encoder neural network (step 406). The system is configured so that the preceding final hidden state of the recurrent neural network has the same dimensionality as the representation of the preceding actual observation output by the encoder neural network.

The recurrent neural network determines the final hidden state of the recurrent neural network for the time step using the second set of recurrent neural network parameters in the same manner as step 210, except the recurrent neural network uses the preceding final hidden state of the recurrent neural network in place of the representation of the preceding actual observation output by the encoder neural network (step 408).

The system determines whether a predicted observation should be generated for the time step (step 410). For example, the system may generate an observation for only a final time step in a sequence of time steps, in order to see the effect of a planned trajectory of actions.

In response to determining that the system should generate a predicted observation for the time step, the system generates a predicted observation for the time step in the same manner as step 312, and if the time step is not a final time step, the system returns to step 402 and repeats the preceding steps (step 412). If the time step is a final time step, then the process 400 terminates.

In response to determining that the system should not generate a predicted observation for the time step, and if the time step is not a final time step, then the system returns to step 402 and repeats the preceding steps. If the time step is a final time step, then the process 400 terminates.

The system can perform prediction-dependent prediction (i.e. processes 200 and 300) and prediction-independent prediction (i.e. processes 200 and 400) for sequences of actions where the actual observations of the environment are not known for time steps beyond the one or more initial time steps. The system can also perform prediction-dependent prediction and prediction-independent prediction for sequences of actions and actual observations of the environment in a set of training data, i.e., a set of sequences of actions for which the actual observations of the environment that result from the sequence of actions are known, in order to determine trained values for the parameters of the environment simulation system, i.e. the recurrent neural network, the decoder neural network, and the encoder neural network. The prediction-dependent prediction or prediction-independent prediction are iteratively performed on sequences of actions and corresponding sequences of actual observations of the environment selected from a set of training data as part of a conventional machine learning training technique to train the layers, for example stochastic gradient descent via backpropagation through time (BPTT).

The training technique seeks to iteratively adjust the parameters of the system in order to optimize the performance of the system on the set of training data according to an objective function. In some implementations, the objective function is of the form:

$$L = \frac{1}{N*(T-\tau)}\sum_{n=1}^{N}\sum_{t=\tau+1}^{T}|x_t^n - \hat{x}_t^n|^2,$$

where N is the number of training sequences in the training set, T is the maximum number of time steps, τ is the number of initial time steps, $x_t^n$ is the actual observation of the environment at time step t of training sequence n, and $\hat{x}_t^n$ is the predicted observation of the environment by the system at time step t of training sequence n.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. An environment simulation system for generating predicted observations characterizing predicted states of an environment that would result from an agent performing actions to interact with the environment, the environment simulation system comprising:
a recurrent neural network implemented by one or more computers and configured to, at each current time step of a sequence of multiple time steps:
receive a preceding action for a preceding time step, the preceding action being an action performed at the preceding time step by the agent interacting with the environment or to be performed at the preceding time step by the agent; and
update a cell state of the recurrent neural network from the preceding time step to generate a cell state for the current time step as a function of the preceding action for the preceding time step; and
a decoder neural network implemented by the one or more computers and configured to, at each of one or more current time steps of the sequence of multiple time steps:
process an input derived from the cell state of the recurrent neural network for the current time step to generate a predicted observation characterizing a predicted state of the environment at the current time step.

2. The system of claim 1, wherein updating the cell state of the recurrent neural network from the preceding time step to generate the cell state for the current time step as a function of the preceding action for the preceding time step comprises:
generating an initial hidden state of the recurrent neural network for the current time step as a function of the preceding action and a final hidden state of the recurrent neural network for the preceding time step; and
updating the cell state of the recurrent neural network from the preceding time step using at least the initial hidden state for the current time step to generate the cell state for the current time step.

3. The system of claim 2, wherein generating the initial hidden state of the recurrent neural network for the current time step as a function of the preceding action and the final hidden state of the recurrent neural network for the preceding time step comprises:
applying a first parameter matrix to the final hidden state of the recurrent neural network for the preceding time step to generate a transformed final hidden state;
applying a second parameter matrix to the preceding action to generate a transformed preceding action; and
combining the transformed final hidden state and the transformed preceding action to generate the initial hidden state of the recurrent neural network for the current time step.

4. The system of claim 2, wherein generating the initial hidden state of the recurrent neural network for the current time step as a function of the preceding action and the final hidden state of the recurrent neural network for the preceding time step comprises:
applying a dimension-preserving convolution having different parameters for different actions.

5. The system of claim 1, wherein at each current time step of the sequence of multiple time steps, the recurrent neural network is further configured to:
generate a final hidden state of the recurrent neural network for the current time step using the cell state for the current time step.

6. The system of claim 5, wherein at each of one or more current time steps of the sequence of multiple time steps, the decoder neural network is further configured to:
receive the final hidden state of the recurrent neural network for the current time step;
wherein processing the input derived from the cell state of the recurrent neural network for the current time step to generate the predicted observation characterizing the predicted state of the environment at the current time step comprises:
processing the final hidden state of the recurrent neural network for the current time step to generate the predicted observation characterizing the predicted state of the environment at the current time step.

7. The system of claim 1, wherein the predicted observation is a predicted image of the environment at the current time step.

8. The system of claim 1, wherein the recurrent neural network is further configured to:
at each of one or more initial time steps of the sequence of multiple time steps:
receive an encoded representation of a preceding actual observation characterizing an actual state of the environment at the preceding time step; and
update the cell state of the recurrent neural network from the preceding time step to generate the cell state for the current time step using the encoded representation of the preceding actual observation in addition to the preceding action for the preceding time step.

9. The system of claim 8, further comprising:
an encoder neural network implemented by the one or more computers and configured to, at each of the one or more initial time steps:
receive the preceding actual observation; and
process the preceding actual observation to generate the encoded representation of the preceding actual observation.

10. The system of claim 8, wherein the recurrent neural network is further configured to:
at each time step of the sequence of multiple time steps that is after the one or more initial time steps:
receive an encoded representation of a preceding predicted observation, the preceding predicted observation being for the preceding time step and characterizing a predicted state of the environment at the preceding time step; and
update the cell state of the recurrent neural network from the preceding time step to generate the cell state for the current time step using the encoded representation of the preceding predicted observation in addition to the preceding action for the preceding time step.

11. The system of claim 10, wherein the decoder neural network is configured to generate a predicted observation at each of the time steps that is after the one or more initial time steps.

12. The system of claim 8, wherein the recurrent neural network is further configured to:

at each time step of the sequence of multiple time steps that is after the one or more initial time steps:
  update the cell state of the recurrent neural network from the preceding time step to generate the cell state for the current time step using a final hidden state from the preceding time step in place of the encoded representation of the preceding actual observation.

13. The system of claim 1, wherein the decoder neural network is configured to generate a predicted observation at only a proper subset of the time steps in the sequence of multiple time steps.

14. A method performed by one or more data processing apparatus for generating predicted observations characterizing predicted states of an environment that would result from an agent performing actions to interact with the environment, the method comprising:
  at each current time step of a sequence of multiple time steps:
    receiving a preceding action for a preceding time step, the preceding action being an action performed at the preceding time step by the agent interacting with the environment or to be performed at the preceding time step by the agent; and
    updating a cell state of the recurrent neural network from the preceding time step to generate a cell state for the current time step as a function of the preceding action for the preceding time step; and
  at each of one or more current time steps of the sequence of multiple time steps:
    processing, by a decoder neural network, an input derived from the cell state of the recurrent neural network for the current time step to generate a predicted observation characterizing a predicted state of the environment at the current time step.

15. The method of claim 14, wherein updating the cell state of the recurrent neural network from the preceding time step to generate the cell state for the current time step as a function of the preceding action for the preceding time step comprises:
  generating an initial hidden state of the recurrent neural network for the current time step as a function of the preceding action and a final hidden state of the recurrent neural network for the preceding time step; and
  updating the cell state of the recurrent neural network from the preceding time step using at least the initial hidden state for the current time step to generate the cell state for the current time step.

16. The method of claim 15, wherein generating the initial hidden state of the recurrent neural network for the current time step as a function of the preceding action and the final hidden state of the recurrent neural network for the preceding time step comprises:
  applying a first parameter matrix to the final hidden state of the recurrent neural network for the preceding time step to generate a transformed final hidden state;
  applying a second parameter matrix to the preceding action to generate a transformed preceding action; and
  combining the transformed final hidden state and the transformed preceding action to generate the initial hidden state of the recurrent neural network for the current time step.

17. The method of claim 15, wherein generating the initial hidden state of the recurrent neural network for the current time step as a function of the preceding action and the final hidden state of the recurrent neural network for the preceding time step comprises:
  applying a dimension-preserving convolution having different parameters for different actions.

18. One or more non-transitory computer storage media storing instructions that when executed by one or more computers cause the one or more computers to perform operations for generating predicted observations characterizing predicted states of an environment that would result from an agent performing actions to interact with the environment, the operations comprising:
  at each current time step of a sequence of multiple time steps:
    receiving a preceding action for a preceding time step, the preceding action being an action performed at the preceding time step by the agent interacting with the environment or to be performed at the preceding time step by the agent; and
    updating a cell state of the recurrent neural network from the preceding time step to generate a cell state for the current time step as a function of the preceding action for the preceding time step; and
  at each of one or more current time steps of the sequence of multiple time steps:
    processing, by a decoder neural network, an input derived from the cell state of the recurrent neural network for the current time step to generate a predicted observation characterizing a predicted state of the environment at the current time step.

19. The non-transitory computer storage media of claim 18, wherein updating the cell state of the recurrent neural network from the preceding time step to generate the cell state for the current time step as a function of the preceding action for the preceding time step comprises:
  generating an initial hidden state of the recurrent neural network for the current time step as a function of the preceding action and a final hidden state of the recurrent neural network for the preceding time step; and
  updating the cell state of the recurrent neural network from the preceding time step using at least the initial hidden state for the current time step to generate the cell state for the current time step.

20. The non-transitory computer storage media of claim 19, wherein generating the initial hidden state of the recurrent neural network for the current time step as a function of the preceding action and the final hidden state of the recurrent neural network for the preceding time step comprises:
  applying a first parameter matrix to the final hidden state of the recurrent neural network for the preceding time step to generate a transformed final hidden state;
  applying a second parameter matrix to the preceding action to generate a transformed preceding action; and
  combining the transformed final hidden state and the transformed preceding action to generate the initial hidden state of the recurrent neural network for the current time step.

* * * * *